US010821782B2

United States Patent
Tezuka

(10) Patent No.: US 10,821,782 B2
(45) Date of Patent: Nov. 3, 2020

(54) TIRE TREAD FOR REDUCING NOISE

(71) Applicant: COMPAGNIE GENERALE DES ETABLISSEMENTS MICHELIN, Clermont-Ferrand (FR)

(72) Inventor: Takashi Tezuka, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 255 days.

(21) Appl. No.: 15/740,723

(22) PCT Filed: Jun. 20, 2016

(86) PCT No.: PCT/JP2016/002956
§ 371 (c)(1),
(2) Date: Dec. 28, 2017

(87) PCT Pub. No.: WO2017/002320
PCT Pub. Date: Jan. 5, 2017

(65) Prior Publication Data
US 2018/0194174 A1 Jul. 12, 2018

(30) Foreign Application Priority Data
Jun. 29, 2015 (WO) .................. PCT/JP2015/069365

(51) Int. Cl.
*B60C 11/13* (2006.01)
*B60C 11/14* (2006.01)
*B60C 11/03* (2006.01)

(52) U.S. Cl.
CPC .......... *B60C 11/1369* (2013.01); *B60C 11/14* (2013.01); *B60C 11/0306* (2013.01); *B60C 2011/0334* (2013.01)

(58) Field of Classification Search
CPC ... B60C 11/1369; B60C 11/14; B60C 19/002; B60C 11/1353; B60C 11/042; B60C 11/032; B60C 11/1307
See application file for complete search history.

(56) References Cited

U.S. PATENT DOCUMENTS 5,022,448 A 6/1991 Ochiai
6,484,772 B1 11/2002 De Labareyre et al.
(Continued)

FOREIGN PATENT DOCUMENTS

JP 55-113606 U 8/1980
JP 06135208 A * 5/1994
(Continued)

OTHER PUBLICATIONS

Engineering Composite Materials (2nd Edition), Table 1.1 Typical Properties of Some Familiar Reinforcing Fibers (Year: 1999).*
(Continued)

*Primary Examiner* — Jacob T Minskey
*Assistant Examiner* — Virak Nguon
(74) *Attorney, Agent, or Firm* — Dickinson Wright PLLC; Steven Hurles

(57) ABSTRACT

Present disclosure provides a tread for a tire having a plurality of contact element having a height H, and at least one connecting member connecting a transverse face of the contact element to the transverse face of the circumferentially adjacent contact element extending continuously through two transverse faces of the same contact element, a distance h between one of the connecting member in a groove and a radial position of the contact face being at most equal to 50% of the height H, and a material of the connecting member being different from a material of the contact element, a young modulus of the material of the connecting member being higher than that of the contact
(Continued)

element, a distance h' between one of the connecting member in the contact element and the contact lace in tire radial direction is greater than the distance h of the same connecting member.

10 Claims, 2 Drawing Sheets

(56) References Cited

U.S. PATENT DOCUMENTS

| | | | |
|---|---|---|---|
| 2008/0078488 | A1 | 4/2008 | Yoda |
| 2014/0090548 | A1* | 4/2014 | Abad .................... B29D 30/52 87/6 |
| 2014/0290814 | A1* | 10/2014 | Audigier ............ B60C 11/0306 152/209.17 |

FOREIGN PATENT DOCUMENTS

| | | |
|---|---|---|
| JP | 07-040705 A | 2/1995 |
| JP | 07-329511 A | 12/1995 |
| JP | 10-225936 A | 8/1998 |
| JP | 2001-138714 A | 5/2001 |
| JP | 2002-331525 A | 11/2002 |
| JP | 2002-331526 A | 11/2002 |
| JP | 2011-255716 A | 12/2011 |
| WO | 2016/104662 A1 | 6/2016 |

OTHER PUBLICATIONS

International Search Report issued in related application No. PCT/JP2015/069365 dated Aug. 25, 2015.

* cited by examiner

[Fig. 1]
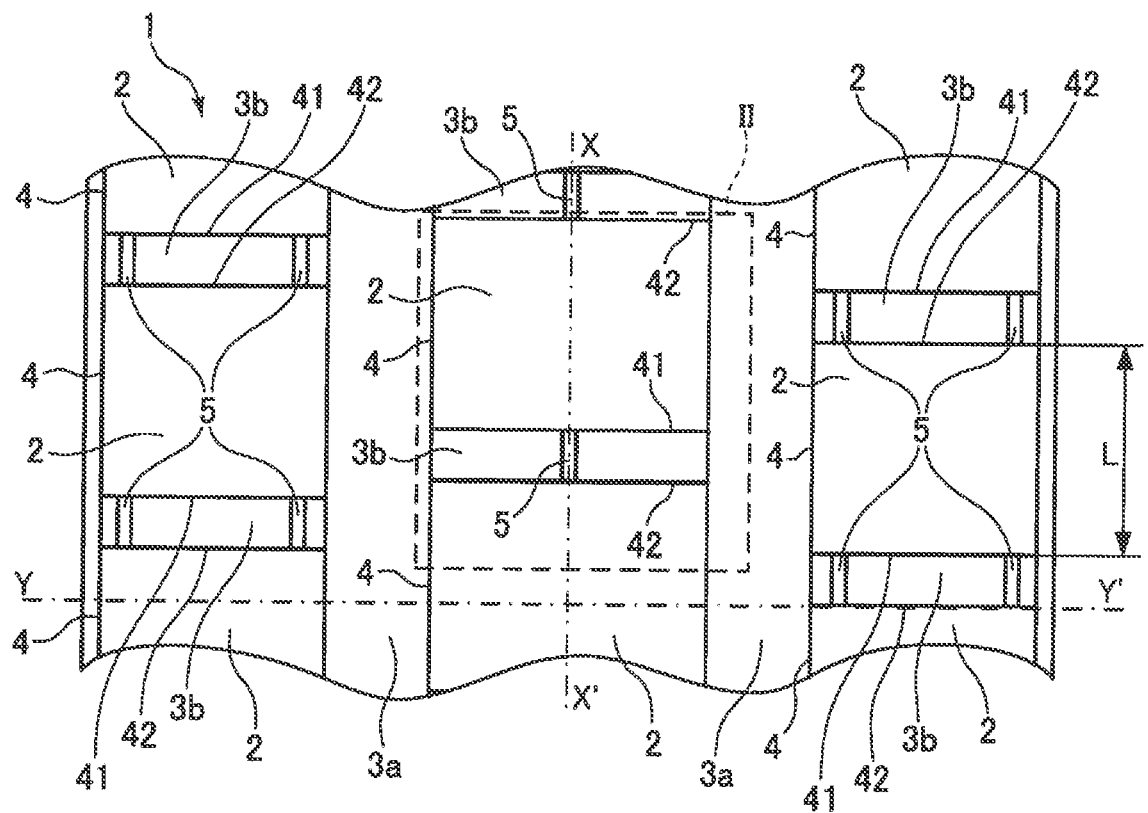
[Fig. 2]
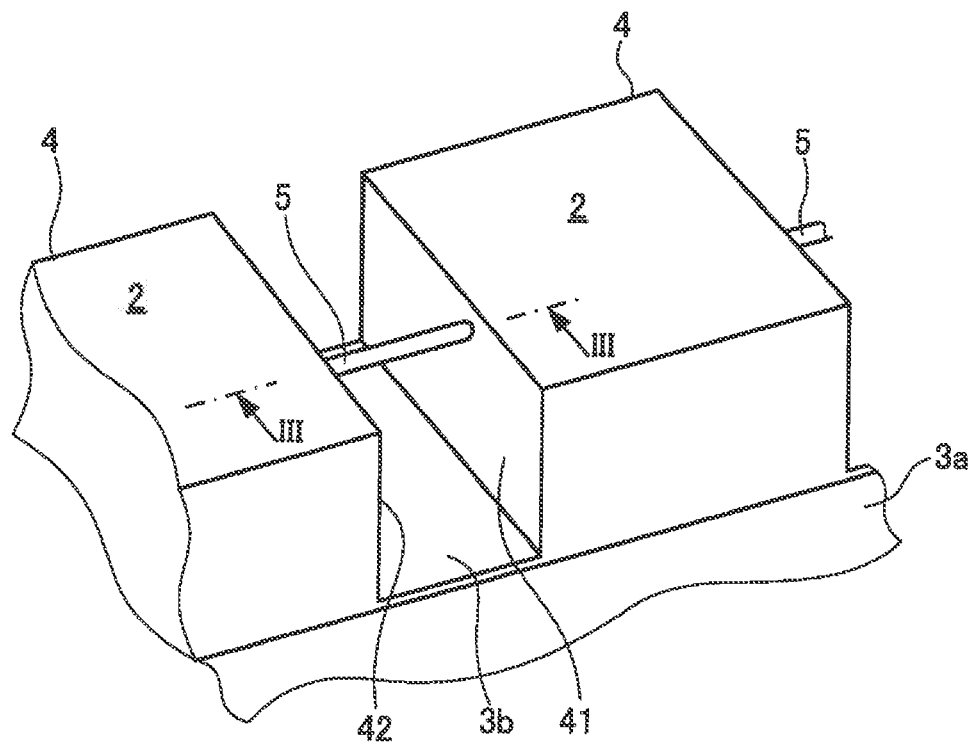

[Fig. 3]
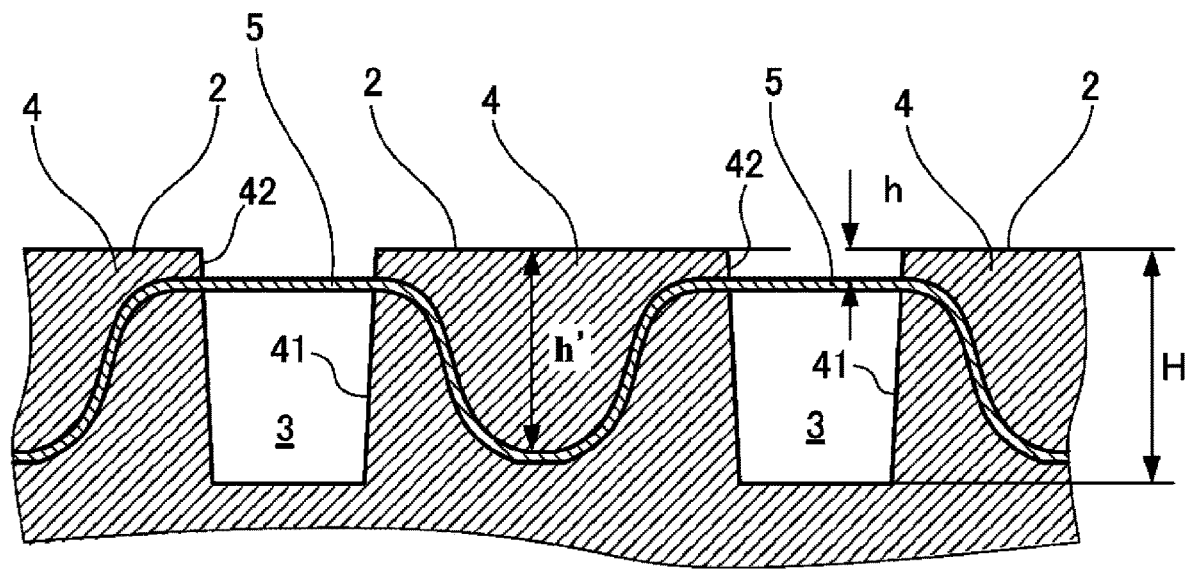
FIG.4
<PRIOR ART>
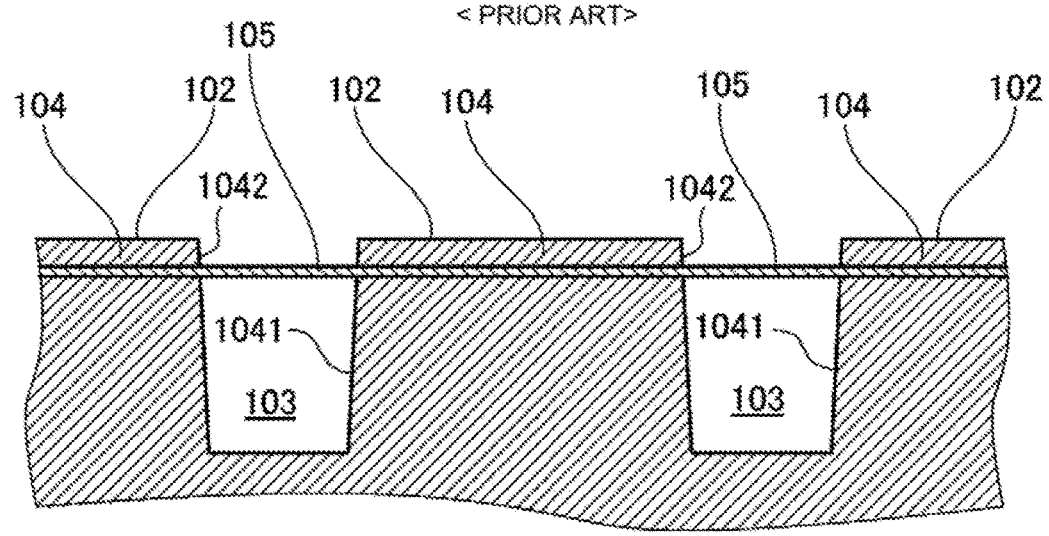

TIRE TREAD FOR REDUCING NOISE

This application is a 371 national phase entry of PCT/JP2016/002956, filed 20 Jun. 2016, which claims the benefit of International Patent Application No. PCT/JP2015/069365, filed 29 Jun. 2015.

BACKGROUND

The present disclosure relates to a tread for a tire and in particular to a tread having a connecting member between two adjacent contact elements for reducing noise, and to a tire having such tread.

In recent years, premiumisation and quality improvement of vehicles leads, from the view point of occupant's comfort and environmental considerations, desire to various noise reductions, in particular pass-by noise.

When a contact element on a tread of a tire enters to or exits from a contact patch du ring rolling, the tread is forced to be bent due to flattening. At this stage, geometrical discontinuity due to periodical existence of grooves extending axial direction which leads inhomogeneity of a bending stiffness of the tread in a circumferential direction excites intern al construction of the tire, generating noise.

In order to reduce such inhomogeneity of the bending stiffness of the tread in a circumferential direction, it is known that reduction of a volume of the groove extending in an axial direction is effective. However, it is also known that reduction of the volume of the groove extending in an axial direction penalizes hydroplaning performance of the tread. Thus, there is a need to improve noise performance while maintaining hydroplaning performance. In response to such need, following arrangement has been proposed.

JPH07-329511A discloses, in FIG. 5, a pneumatic tire having a plurality of reinforcing elements extending in a lateral groove alternately from two opposed contact elements, and reinforcing element having an overlapping each other.

JP2011-255716A discloses, in FIG. 2 a pneumatic tire having a bridge-like reinforcing portion at closer position to a tread surface, and having a cavity closer to a groove bottom.

JP2001-511733A discloses, in FIG. 1, a pneumatic tire tread having a connecting element made of rubber, such connecting element connects two opposed main walls.

The above arrangement intends to reduce inhomogeneity of the bending stiffness in the tread for reducing the noise, while maintaining the volume of groove to achieve satisfactory hydroplaning performance.

However, with the above arrangements, the ratio of the volume of the reinforcing element or portion (or connecting element, connecting member or bridging member) relative to the volume of groove has been still large to obtain satisfactory hydroplaning performance. Therefore, it is difficult to obtain satisfactory hydroplaning performance simultaneously with satisfactory noise performance.

JPS55-113606U discloses, in FIG. 1, a tire having a bridging member connecting two opposed walls in a groove in circumferential orientation and being exposed in the groove and being made of metal wire, plastic wire or rubber for easy anchoring of a tire chain.

The applicants have proposed in the yet unpublished international patent application PCT/JP2014/084760, in FIG. 1 a tire tread having a connecting member connecting a transverse face of a contact element to a transverse face of a circumferentially adjacent contact element and being made of a material having a higher Young modulus than a Young modulus of a contact element to obtain satisfactory hydroplaning performance and satisfactory noise performance at the same time. In FIG. 6, a tire tread having a connecting member connecting a transverse face of a contact element to a transverse face of circumferentially adjacent contact element and extending continuously through two transverse faces of the same contact element for improving productivity of such tread.

However, with the above arrangements, effectiveness of introducing the connecting member for reducing inhomogeneity of the bending stiffness in the tread for reducing the noise while keeping a good productivity is limited, because the connecting member reinforces also the contact.

Definitions

A "tire" is all types of elastic tire whether or not subjected to an internal pressure A "groove" is a space between two rubber faces/sidewalls which do not contact between themselves under usual rolling condition connected by another rubber face/bottom.

A groove has a width and a depth.

A "radial direction" is a direction perpendicular to an axis of rotation of a tire. This direction is the direction of the thickness of a tread.

A "transverse direction" or an "axial direction" is a direction parallel to an axis of rotation of a tire.

A "circumferential direction" is a direction tangent to any circle centered on an axis of rotation of a tire. This direction is perpendicular to both the radial direction and the transverse direction.

A "contact patch" is a footprint of a tire mounted onto its standard rim as identified in tire standards such as ETRTO, JATMA or TRA, and inflated at its nominal pressure and under its nominal load.

A term "wavy" can be interpreted as meaning zigzagging or even oscillating between two levels, a minimum level and a maximum level both should be considered as a radial distance from a contact face.

SUMMARY

It is thus an object of the disclosure to provide a solution for designing a tread for a tire, said tread having the connecting member connecting a transverse faces of a contact element extending continuously through the contact element for a better productivity while improving noise performance and maintaining hydroplaning performance.

The present disclosure provide a tread for a tire having at least one groove formed in the tread, a plurality of contact elements delimited by the plurality of grooves and having circumferential faces, transverse faces and a contact face intended to come into contact with ground during rolling, the contact element having a height H, and at least one connecting member connecting the transverse face of the contact element to the transverse face of the circumferentially adjacent contact element and extending continuously through two transverse faces of the same contact element, a distance h in tire radial direction being between one of the connecting member in the groove and a radial position of the contact face at most equal to 50% of the height H. and a material of the connecting member being different from a material of the contact element, a young modulus of the material of the connecting member being higher than a young modulus of the material of the contact element, a distance h' between one of the connecting member in the contact element and the contact face in tire radial direction is greater than the distance h of the same connecting member.

This arrangement permits having homogeneous distribution of the bending stiffness of the tread in circumferential direction which results noise performance improvement while maintaining hydroplaning performance and a good productivity.

Since the connecting member is made of the material different from the material constituting the contact element and having higher Young modulus than the material constituting the contact element, inhomogeneity of the bending stiffness of the tread in circumferential direction is drastically decreased. As a result, excitation of internal construction of the tire is reduced, thus noise generated during rolling of the tire is also reduced.

At the same time, higher Young modulus of the material constituting the connecting member than that of the material constituting the contact elements allows to efficiently re duce inhomogeneity of the bending stiffness of the tread in circumferential direction. As a result, volume of the connecting member in the groove can be reduced and thus hydroplaning performance can be maintained.

By setting the distance h between at least one connecting member and a radial position of the contact face to at most equal to 50% of the height H of the contact element, the connecting member can be located far enough from the groove bottom for efficiently reducing inhomogeneity of the bending stiffness of the tread in circumferential direction, which results further less volume of the connecting member in the groove, thus hydroplaning performance can be maintained further.

As the connecting member extends continuously through two transverse faces of the same contact element that is the connecting member extends circumferentially through a plurality of circumferentially arranged contact elements, the tread with the connecting member can be efficiently manufactured. As a result, productivity for manufacturing such tread is increased.

By setting the distance h' in tire radial direction between one of the connecting members in the contact element and the radial position of the contact face greater than the distance h of the same connecting member, inhomogeneity of the bending stiffness of the tread can be efficiently reduced, because stiffening effect by the connecting member in the contact element which is stiffer in bending than in the groove can be decreased. As a result, noise level emitted from the tread can be decreased.

Also at the same time, thanks to greater distance of h' than the distance h, the connecting member can sustain a pullout force from the contact element applied to the connecting member during rolling and deformation due to flattening. As a result, durability of the tread can be increased.

In another advantageous embodiment, a difference between the distance h' and the distance h (h'-h) is greater than or equal to 20% of the height H.

According to this arrangement, inhomogeneity of the bending stiffness of the tread c an be efficiently reduced, because stiffening effect of connecting member in the contact element can satisfactory be decreased, thus noise level emitted from the tread can further be decreased. This difference is preferably greater than or equal to 25% of the height H, more preferably greater than or equal to 30%, still more preferably greater than or equal to 40%.

In another advantageous embodiment, the distance h' is at most equal to 100% of the height H.

According to this arrangement, durability of the tread having the connecting member can be improved, because if the distance h' exceeds 100% of the height f, there is a risk that the connecting member may make contact with an element of the tire internal construction. By maintaining this distance h' at most equal to 100% of the height H, it is possible to avoid such risk. The distance h' is preferably at most equal to 95% of the height H, m ore preferably at most equal to 90%.

In another advantageous embodiment, the distance h is less than or equal to 30% of the height H.

According to this arrangement, inhomogeneity of the bending stiffness of the tread can be efficiently reduced, because the connecting member locates far enough from the groove bottom in the groove area, thus the noise from the tread can be efficiently reduced. The distance h is preferably at most equal to 25% of the height H of the contact element, more preferably at most equal to 20%, and still more preferably at most equal to 15%.

In another advantageous embodiment, the Young modulus of the material of the connecting member is within a range of 0.05 GPa to 250 GPa.

According to this arrangement, bending stiffness variation of the tread in circumferential direction can be efficiently controlled. As a result, noise emitted from the tread can be decreased.

If this Young modulus is less than 0.05 GPa, stiffening of the tread at the groove becomes insufficient, thus noise performance will not be sufficiently improved. If this Young modulus is more than 250 GPa, the bending stiffness of the tread at the groove becomes too high and another bending stiffness variation of the tread in circumferential direction w ill be created, thus noise performance improvement cannot be achieved.

The Young modulus of the material constituting the connecting member is preferably in a range of 0.1 GPa to 150 GPa, more preferably in a range of 0.5 GPa to 3 GPa.

In another advantageous embodiment, a ratio of a volume occupied by the connecting member relative to a volume of the groove between the circumferentially opposed trans verse faces of the circumferentially adjacent contact elements, is less than or equal to 10%.

According to this arrangement, hydroplaning performance of the tread is maintained even though such tread is provided with the connecting member in the groove for improving noise performance.

If the ratio is more than 10%, hydroplaning performance of the tread is deteriorated. The ratio is preferably at most equal to 8%, more preferably in a range of 0.1% to 5%.

In another advantageous embodiment, at most equal to five connecting members are provided on one transverse face of the contact element.

According to this arrangement, noise performance improvement and manufacturing efficiency of the tread are well-balanced. If the number of the connecting member on one transverse face is more than five, manufacturing efficiency of the tread will decrease. The number of the connecting member on one transverse face is preferably at most equal to three.

In another advantageous embodiment, the connecting member extends in wavy manner in the contact element from one transverse face to other transverse face in the same contact element.

According to this arrangement, durability of the tread can be increased, because the connecting member can sustain a pullout force from the contact element applied to the connecting member during rolling and deformation due to flattening, thanks to wavy extension of the connecting member in the contact element.

In another advantageous embodiment, a connecting member extends in a direction at an angle less than or equal to 30 degrees relative to a circumferential direction.

According to this arrangement, a force tangent to the connecting member can be minimized and thus the noise from the tread is efficiently reduced. The above angle of the connecting member relative to a circumferential direction is preferably at most equal to 20 degrees, and more preferably at most equal to 10 degrees, and still more preferably in a range of 0 degree to 5 degrees.

BRIEF DESCRIPTION OF DRAWINGS

Other characteristics and advantages of the disclosure arise from the description ma de hereafter in reference to the annexed drawings which show, as nonrestrictive examples, the embodiments of the disclosure.

FIG. 1 is a schematic plan view of a tread according to an embodiment of the present disclosure;

FIG. 2 is an enlarged schematic perspective view showing a portion indicated as II in FIG. 1;

FIG. 3 is a cross sectional view taken along III-III line in FIG. 2;

FIG. 4 is a cross sectional view of a tread in the prior art;

DETAILED DESCRIPTION

Preferred embodiments of the present disclosure will be described below referring to the drawings.

A tread 1 for tire according to an embodiment of the present disclosure will be described referring to FIGS. 1, 2 and 3. FIG. 1 is a schematic plan view of a tread 1 according to the embodiment of the present disclosure. FIG. 2 is an enlarged schematic perspective view showing a portion indicated as II in FIG. 1. FIG. 3 is a cross sectional view taken along III-III line in FIG. 2.

The tread 1 is a tread for a tire having dimension 205/55R16 and comprises a plurality of circumferential grooves 3a extending in a tire circumferential direction indicated as XX' and axial grooves 3b extending in a generally tire axial direction indicated as YY'.

As shown in FIG. 1, a plurality of contact elements 4 having generally rectangular parallelepiped are formed in the tread 1. The contact element 4 is delimited by the circumferential grooves 3a in a circumferential direction and is delimited by axial grooves 3b in an axial direction. Thus, the contact element 4 has two transverse faces 41, 42 facing opposite circumferential directions. Distance between the above two transverse faces 41, 42 corresponds to circumferential length L of the contact element 4. In the present embodiment, the circumferential length L is 30 mm.

Adjacently arranged contact elements 4 in a circumferential direction are separated in a circumferential direction by the axial groove 3b. The contact element 4 has a contact face 2 intended to come into contact with ground during rolling at the top portion thereof.

The tread 1 has the same structure as the conventional tread except for an arrangement regarding the connecting member 5 and is intended to be applied to a conventional pneumatic radial tire. Thus, description of the internal construction of the tread 1 will be omitted Between two circumferentially adjacent contact elements 4, a connecting member 5 having a thin rod-like shape, is provided. The connecting member 5 extends across the axial groove 3b between two circumferentially adjacent contact elements 4, as shown in FIGS. 1 and 2.

In the present embodiment, one connecting member 5 is provided between circumferentially adjacent contact elements 4 in axially central region in the tread 1. That is, in axially central area, a plurality of the circumferentially adjacent contact elements 4 are connected by one connecting member 5.

On the other hand, two connecting members 5 are provided between circumferentially adjacent contact elements 4 in axially outward regions in the tread 1. That is, in axially outward areas, a plurality of the circumferentially adjacent contact elements 4 are connected by two connecting members 5. Two connecting members 5 positioned at the same radial position.

In the present embodiment, the connecting members 5 are arranged so as to extend substantially along the circumferential direction maintaining a constant distance from the rotation axis of the tire in the groove 5. That is, the connecting members 5 extend in parallel to the contact face 2 in the groove 5.

A number of connecting members 5 connecting opposed transverse faces 41, 42 of the adjacent contact elements 4 can be changed in a range of one to five.

Each the connecting member 5 extends along the circumferential groove 3a, thus an angle of an extending direction of the connecting member 5 relative to tire circumferential direction is 0 degree, which is preferably less than or equal to 30 degrees relative to the circumferential direction, more preferably at most equal to 20 degrees, and still more preferably at most equal to 10 degrees, and particularly in a range of 0 degree to 5 degrees.

The contact element 4 has a height H (radial length), as shown FIG. 3. A radial distance h between the connecting member 5 extending in the groove 3 (specifically, a radially outward surface of the connecting member 5 extending in the groove 3) and a radial posit ion of the contact face 2 is equal to or less than 50% of the height H. In the present embodiment, the height H is 7.7 mm and the distance h is 1 mm, thus the distance h is 13% of the height H.

A material constituting the connecting member 5 is different from a material constituting the contact element 4, and a Young modulus of the material constituting the connecting member 5 is higher than a Young modulus of the material constituting the contact element. In the present case, the connecting member 5 is made of a metal cord (160 GPa in Young modulus), and the contact element 4 is made of a rubber composition (0.02 GPa in Young modulus).

The connecting member 5 occupies at most equal to 10% of a volume of the axial groove 3b defined or formed between two opposed transverse faces 41, 42 spaced apart in tire circumferential direction. In the present case, the connecting member 5 occupies 1.4% of the axial groove 3b by volume in case of one connecting member 5 is used, 2.8% in case of two connecting members 5 are used.

In the present embodiment, one elongated connecting member 5 passes continuously through a plurality of contact elements 4 arranged circumferentially, as shown FIG. 3, for efficiently manufacturing (increased productivity) the tread 1 with the connecting member 5 as there will be no need to apply individual connecting member 5 to each contact element 4.

The connecting member 5 extends in the contact element 4 so as to downwardly convexly wind in wavy manner so as to form a bump which radially inwardly protrudes, as shown in FIG. 3. That is, the radial position of the connecting member 5 in the contact element 4 continuously varies. A radial distance h' between the connecting member 5 at a radially innermost position in the contact element 4 (specifically, a radially outward surface of the connecting member 5 at the tip end of the bump) and the contact face 2 is greater than the distance h of the same connecting member 5.

Therefore, stiffening effect of the connecting member 5 in the contact element 4 which is already stiffer in bending than in the groove 3 is decreased. Also at the same time, the connecting member 5 can sustain a pullout force from the contact element 4 applied to the connecting member 5 during rolling and deformation due to flattening, thanks to an extension manner of the connecting member 5 in the contact element 4. In the present case, the distance h' is 4.0 mm, thus the distance h' is 52% of the height H, thus, a difference between the distance h' and the distance h (h'−h) is 39% of the height H. This difference between the distance h' and the distance h (h'−h) is preferably greater than or equal to 20% of the height H, more preferably greater than or equal to 25%, still more preferably greater than or equal to 30% and particularly greater than or equal to 40%.

The distance h' is set also at most equal to 100% of the height H so as to avoid a risk that the connecting member contacts with a tire internal construction. This distance h' should be set to maintain at least 1 mm from any elements in the tire internal construction, and is preferably at most equal to 95% of the height H, more preferably at most equal to 90%.

In the arrangement of the embodiment, inhomogeneity of the bending stiffness of the tread 1 in circumferential direction can be drastically decreases, which results less excitation of internal construction of the tire. Thus, noise generated during rolling of the tire can be reduced.

The Young modulus of the material constituting the connecting member 5 is preferably within a range of 0.1 GPa to 150 GPa, more preferably within a range of 0.5 GPa to 3 GPa.

Higher Young modulus of the material constituting the connecting member 5 than that of the material constituting the contact element 4 allows to efficiently reduce inhomogeneity of the bending stiffness of the tread 1 in circumferential direction, which leads less volume of the connecting member in the axial groove 3b. Thus, hydroplaning performance can be maintained.

This effect is further emphasized by setting the ratio of a volume occupied by the connecting member 5 relative to a volume of the axial groove 3b between the circumferentially opposed transverse faces 41, 42 of the circumferentially adjacent contact elements 4, to at most equal to 10%.

The above ratio is preferably at most equal to 8%, more preferably at least equal to 0.1% and at most equal to 5%.

By setting the distance h between the connecting member 5 and the contact face 2 to 50% or less than 50% of the height H of the contact element 4, the connecting member 5 is placed far enough from the groove bottom for efficiently reduce inhomogeneity of the bending stiffness of the tread 1 in circumferential direction. This distance h is preferably less than or equal to 30% of the height H, more preferably at most equal to 25% of the height H of the contact element, still more preferably at most equal to 20%, and particularly at most equal to 15%.

In case less distance h is set, the less number of connecting members are required to obtain the same inhomogeneity of the bending stiffness of the tread 1 in circumferential direction. According to the above arrangement in which the connecting member is placed near the contact surface, the inhomogeneity of the bending stiffness of the tread 1 in circumferential direction can be obtained by less number or less volume of connecting members 5. Thus, volume of the connecting member 5 in the axial groove 3b can be reduced resulting that hydroplaning performance is maintained.

Since the number of the connecting members 5 connecting transverse faces 41, 42 of the adjacent contact elements 4 is selected in a range of one to five, noise performance improvement and manufacturing efficiency are well balanced in the tread 1.

The number of the connecting member 5 connecting transverse face 41, 42 of the adjacent contact elements 4 is more preferably in a range of one to three.

The material suitable for the connecting member 5 is, for example, thermoplastic material as acrylonitrile butadiene styrene copolymer, cellulose acetate, polyamide, Kevlar (trademark), polycarbonate, poly-ether-ether-ketone, polyethylene terephthalate, polystyrene, thermoplastic polyurethane, thermoset material as epoxy, phenolic, polyester, ebonite, metal material as steel, brass, and composite material with reinforcements as carbon fiber, glass fiber, aramid fiber, PET, nylon, vegetal fiber in a form of cord, cable, short fiber or wire. A structure of such cord, cable, short fiber or wire may be monofilament, multifilament or multi-component filament.

The connecting member 5 may be covered with the same material constituting the contact element 4 for better adhesion to the transverse faces 41, 42 of the contact element 4. Other material having better adhesion with the material constituting the contact element 4 can be used for a material for covering the connecting member 5.

In case two or more connecting members 5 are provided on one transverse face 41, 42, each connecting member 5 may be constituted by different material.

Further, in this case, radial position of each connecting member 5 on the transverse faces 41, 42 may be different.

The connecting member 5 may be placed at axially center of the contact element 4 or at axially outward or inward of the contact element 4.

Alternatively, the connecting member 5 may be covered with the same material constituting the contact element 4 which material preferably extends from bottom of the axial groove 3b toward the contact face 2 of the contact element 4 for better durability of the connecting member 5.

Each connecting member 5 may extend in the contact element 4 from one transverse face 41, 42 to other transverse face 42, 41 in the same contact element 4 as to have a plurality of bumps which radially inwardly protrude. Tip end of each bump may be located at a different radial position. In such case, the distance h' should be considered as the distance between the contact face 2 and the tip end of the bump located at a radially innermost position. Specifically, in such case, the distance h' is a distance between the contact face 2 and a radially outward surface of the connecting member 5 at the tip end of a radially innermost bump in the contact element 4.

FIG. 4. is a cross sectional view of a tread of prior art. FIG. 4 shows a plurality of con tact elements 104 delimited by the plurality of grooves 103 and having circumferential faces (not shown), transverse faces 1041, 1042 and a contact face 102 intended to come into contact with ground during rolling, the contact element 104 having at least one connecting member 105 connecting the transverse face 1041, 1042 of the contact element 104 to the transverse face 1041, 1042 of the circumferentially adjacent contact element 104 and ex tending continuously through two transverse faces 1041, 1042 of the same contact element 104. The connecting member 105 has the same radial distance from the contact face 102 both in the groove 103 and in the contact element 104.

A height H (radial length) of the contact element 104 is 7.7 mm, a radial distance between the connecting member 105 and the contact face 102 is 1 mm which is the same both in the groove 103 and in the contact element 104. A material constituting the connecting member 105 is different from a material constituting the contact element 104, and a Young modulus of the material constituting the connecting member 105 which is a metal cord is higher (160 GPa) than a Young modulus of the material constituting the contact element 104 which is a rubber composition (0.02 GPa).

In order to confirm the effect of the present disclosure, two types of tires of Example to which the present disclosure is applied and another type of tire of Comparative Example were prepared. An internal construction of these tires was typical radial tire construction for passenger car tire.

The Example was a tire having a tread as shown in FIG. 3 described in the above embodiment using a nylon cable (3 GPa in Young modulus) as material of connecting member. Each of two opposed transverse faces across the groove extending in tire axial direction was connected by one connecting member. The Comparative Example was a tire having a tread of prior art as shown in FIG. 4 using a nylon cable (3 GPa in Young modulus) as material of connecting member, and Reference was a tire without having the connecting member.

The tire dimension of the Example, Comparative Example and Reference were all 205/55R16, mounted onto a rim of 6.5J×16, and inflated to 180 kPa.

Noise Test:

A sound pressure level dB(A) of the unused test tires mounted onto abovementioned rim, inflated to abovementioned internal pressure were measured while applying a load of 452 daN, running 90 kph on a drum of 2.7 m in diameter having ISO surface in a semi-anechoic chamber, via a microphone installed axially 1 m outward from a center of tire contact, radially 0.2 m backward from a tire rolling axis and 0.32 m in height. The data acquired through the measurements were processed to calculate a sound pressure level of at 800 Hz and 1 kHz (1,000 Hz) bands in ⅓ octave bands, as representative of sensitive frequency bands to human ear. The results are shown in table 1. In this table 1, results are represented by an index of 100 for the Reference, higher the number indicates better the noise performance.

TABLE 1

|  | Example | Comparative Example | Reference |
| --- | --- | --- | --- |
| Noise Performance (800 Hz, index) | 103 | 101 | 100 |
| Noise Performance (1 kHz, index) | 106 | 103 | 100 |

As seen from table 1, the Example tire shows improvement on noise performance while maintaining a good productivity of the tread having a connecting member connecting a transverse face of a contact element to the transverse face of circumferentially adjacent contact element and extending continuously through two transverse faces of the same con tact element.

The disclosure is not limited to the examples described and represented and various modifications can be made there without leaving its framework.

The invention claimed is:

1. A tread (1) for a tire having a plurality of grooves (3) formed in the tread, a plurality of contact elements (4) delimited by the plurality of grooves (3) and having circumferential faces, transverse faces (41, 42) and a contact face (2) intended to come into contact with the ground during rolling, the contact element (4) having a height H, and at least one connecting member (5) connecting the transverse face (41, 42) of the contact element (4) to the transverse face (41, 42) of the circumferentially adjacent contact element (4) and extending continuously through two transverse faces (41, 42) of the same contact element (4), a distance h in the tire radial direction between one of the connecting member (5) in the groove (3) and a radial position of the contact face (2) being at most equal to 50% of the height H, and a material of the connecting member (5) being different from a material of the contact element (4), a Young modulus of the material of the connecting member (5) being higher than a Young modulus of the material of the contact element (4),
the tread wherein a distance h' between one of the connecting member (5) in the contact element (4) and the contact face in the tire radial direction is greater than the distance h of the same connecting member (5).

2. The tread (1) according to claim 1, wherein a difference between the distance h' and the distance h (h'−h) is greater than or equal to 20% of the height H.

3. The tread (1) according to claim 1, wherein the distance h' is at most equal to 100% of the height H.

4. The tread (1) according to claim 1, wherein the distance h is less than or equal to 30% of the height H.

5. The tread (1) according to claim 1, wherein the Young modulus of the material of the connecting member (5) is within a range of 0.05 GPa to 250 GPa.

6. The tread (1) according to claim 1, wherein a ratio of a volume occupied by the connecting member (5) relative to a volume of the groove (3) between the circumferentially opposed transverse faces (41, 42) of the circumferentially adjacent contact elements is less than or equal to 10%.

7. The tread (1) according to claim 1, wherein at most equal to five connecting members (5) are provided on one transverse face (41, 42).

8. The tread (1) according to claim 1, wherein the connecting member (5) extends in a wavy manner in the contact element (4) from one transverse face (41, 42) to the other transverse face (42, 41) in the same contact element (4).

9. The tread (1) according to claim 1, wherein a connecting member (5) extends in a direction at an angle less than or equal to 30 degrees relative to a circumferential direction.

10. A tire having the tread according to claim 1.

* * * * *